No. 655,093. Patented July 31, 1900.
V. F. LAKE.
ROTARY MOTOR.
(Application filed Dec. 15, 1899.)
(No Model.) 3 Sheets—Sheet 1.

Witnesses:
F. W. Wright
Walter Abbe

Inventor:
VINCENT F. LAKE
By Howson and Howson
HIS ATTORNEYS.

No. 655,093. Patented July 31, 1900.
V. F. LAKE.
ROTARY MOTOR.
(Application filed Dec. 15, 1899.)
(No Model.) 3 Sheets—Sheet 2.
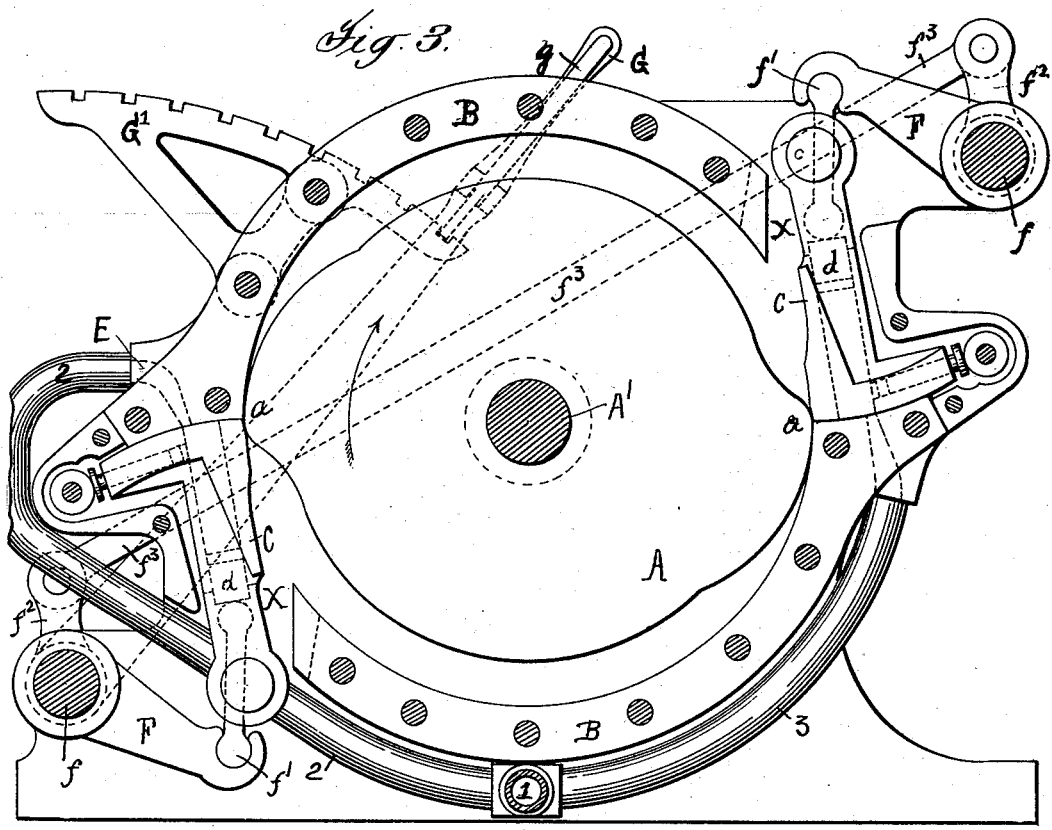
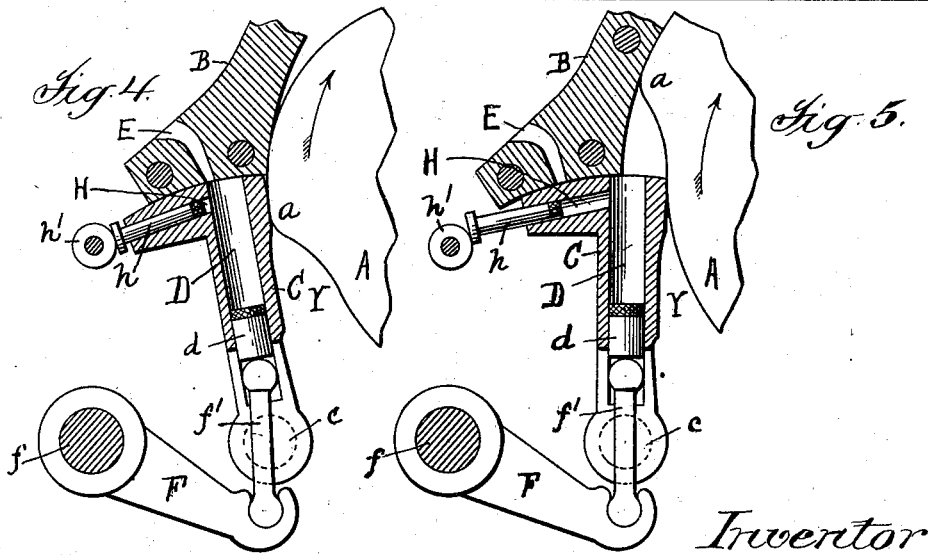
Witnesses.
P. W. Wright.
Walter Abb
Inventor:
VINCENT F. LAKE
By Howser and Howser
HIS ATTORNEYS.

No. 655,093. Patented July 31, 1900.
V. F. LAKE.
ROTARY MOTOR.
(Application filed Dec. 15, 1899.)
(No Model.) 3 Sheets—Sheet 3.
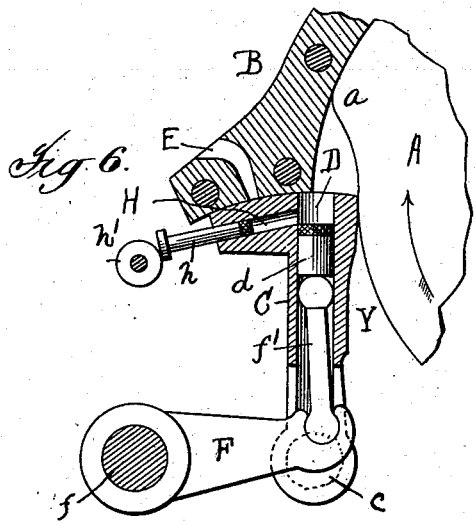
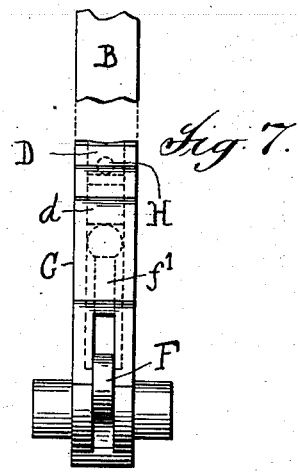
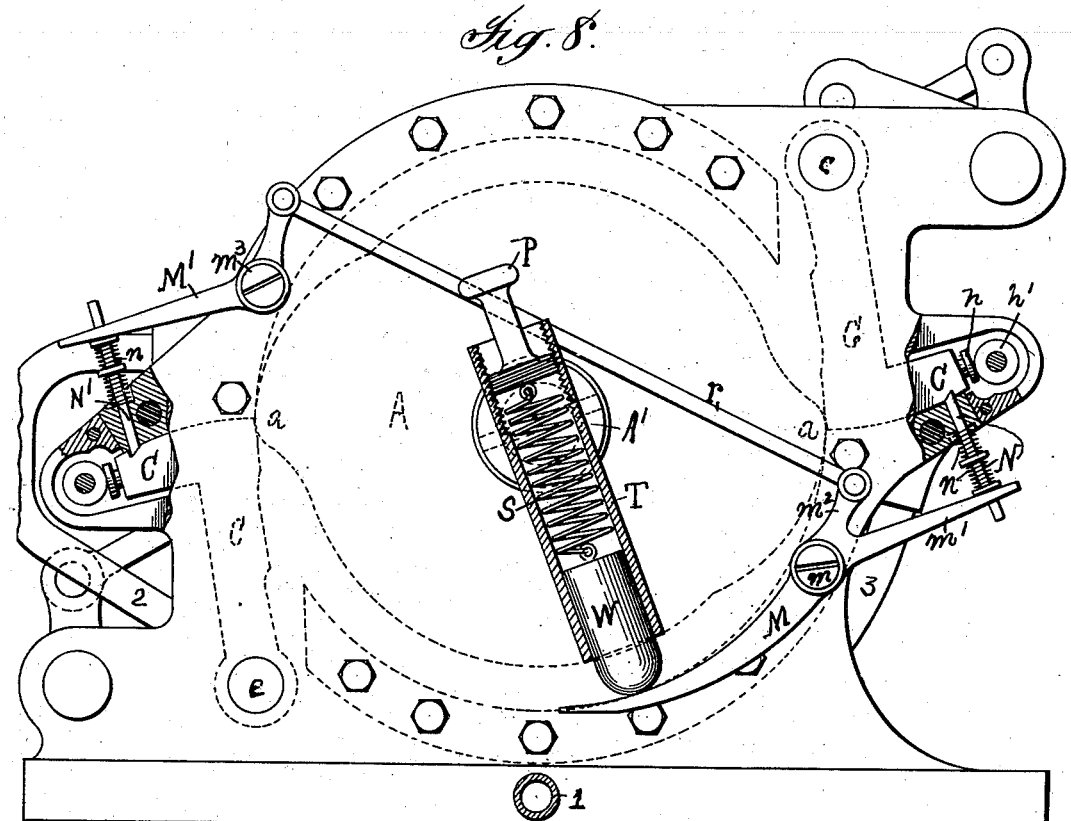
Witnesses:
F. W. Wright.
Walter Abb.
Inventor:
Vincent F. Lake.
By Howson and Howson
His Attorneys.

UNITED STATES PATENT OFFICE.

VINCENT F. LAKE, OF PLEASANTVILLE, NEW JERSEY.

ROTARY MOTOR.

SPECIFICATION forming part of Letters Patent No. 655,093, dated July 31, 1900.

Application filed December 15, 1899. Serial No. 740,469. (No model.)

*To all whom it may concern:*

Be it known that I, VINCENT F. LAKE, a citizen of the United States of America and a resident of and having a post-office address at Pleasantville, Atlantic county, State of New Jersey, have invented Improvements in Rotary Motors, of which the following is a specification.

The object of my invention is to construct a simple and efficient rotary motor adapted to be operated by compressed air, steam, or other motive fluid working expansively. I prefer to embody my invention in a motor of that class in which a piston with cam-like projection or projections rotates in a cylindrical casing and works in conjunction with movable abutments in the casing.

Figure 1:
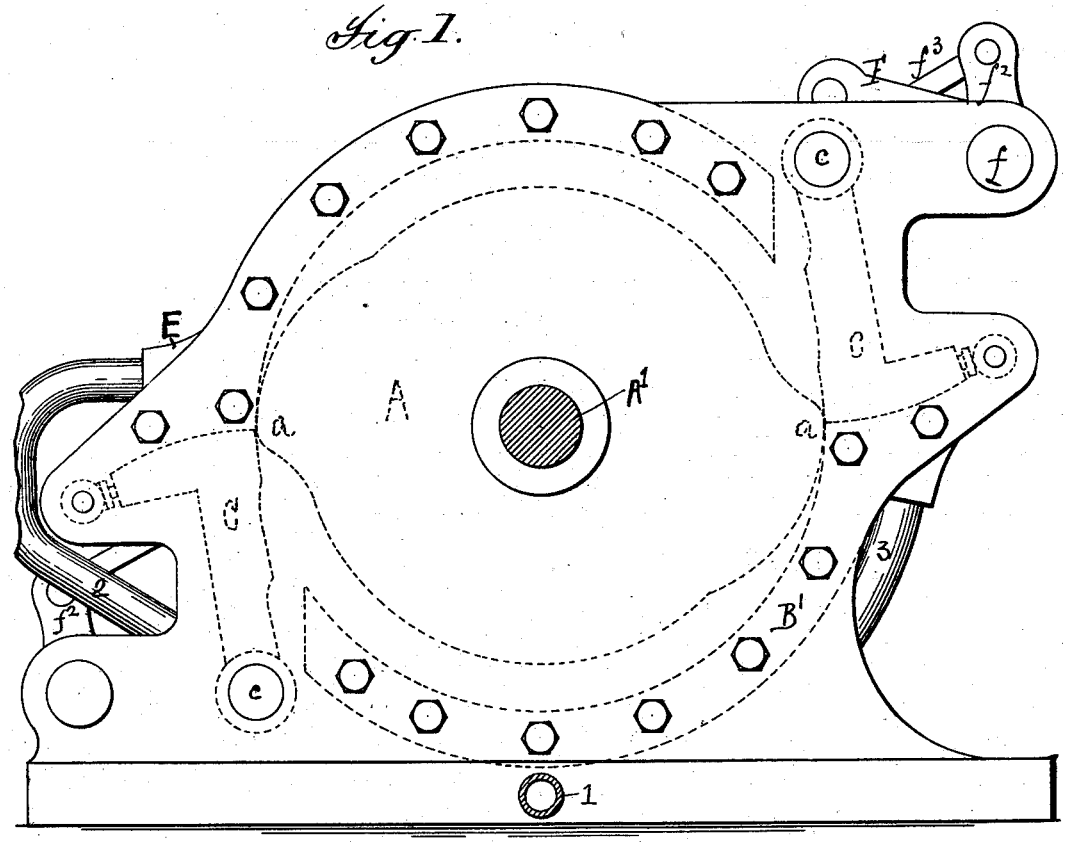
Figure 2:
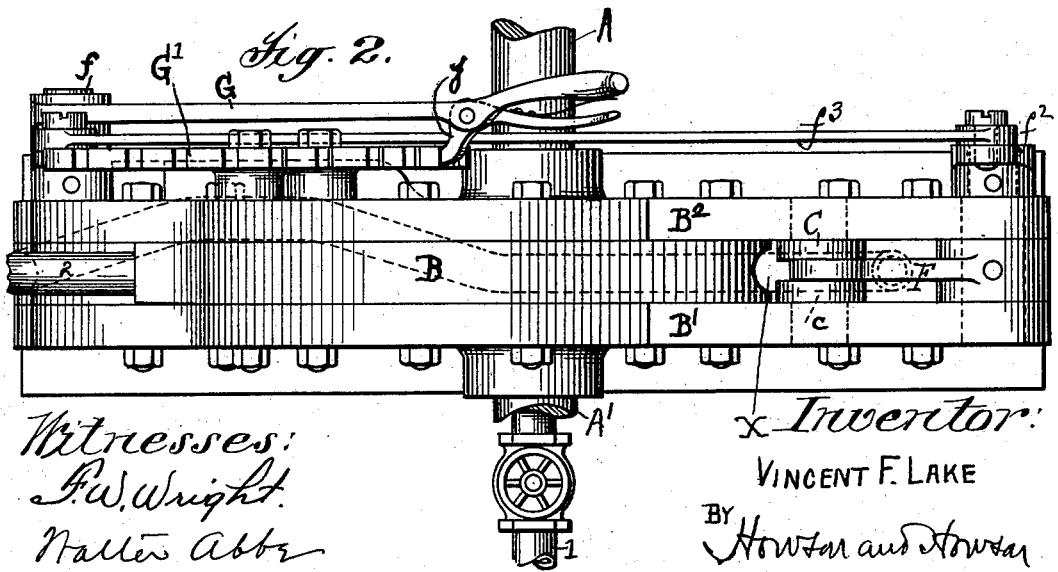

In the accompanying drawings, Figure 1 is a side elevation of a rotary motor constructed in accordance with my invention. Fig. 2 is a plan view of the same. Fig. 3 is a sectional elevation with the front casing removed to illustrate the internal construction. Figs. 4, 5, and 6 are views showing certain movable parts in different positions. Fig. 7 is an edge view of one of the movable abutments, and Fig. 8 is a view illustrating an automatic governing means.

In carrying out my invention the rotary piston may be provided with any suitable number of cam-like projections and a corresponding number of movable abutments in the casing, and the motor may be duplex or triplex or with a greater number of pistons and chambers in which the pistons rotate in conjunction with their several movable parts.

By way of example and as a simple form for illustrating my invention I have shown in the accompanying drawings a motor with a rotary piston A, provided with two diametrically-opposite and similar cam-like projections *a a* and rotating within the working chamber in the cylindrical casing B. The front and back plates B' B² of the casing are provided with bearings for the shaft A' of the rotary piston. In conjunction with this piston there are provided two movable abutments C, which I prefer to make in the form of levers pivoted at *c* to suitable bearings in the side plates of the casing, so as to swing upon these pivots toward and from the central axis of the rotary piston, as caused or permitted by the piston in its rotation. The inner face of the free end of each abutment-lever bears against the periphery of the piston. The cams *a a* force the abutment outward, as shown in Fig. 3. I make use of the pressure of the motive fluid to move the free ends of the abutments inward against the piston as the cams pass. I make each abutment hollow, as shown more clearly in Figs. 4 and 5, to form a longitudinal chamber D, open at the outer end of the abutment, where it oscillates or slides in contact with a corresponding face in the fixed part of the casing, where is provided an inlet-port E for the motive fluid. The motive fluid may be admitted by a pipe 1 through the branches 2 3 to the said ports E, Fig. 3. The end face of the abutment acts as a valve, and the relation of the open end of the chamber D in the abutment to the adjacent port E is such that when the movable abutment is pressed outward by a cam *a* of the rotary piston the chamber D will be open to the inlet-port E for the admission of motive fluid to the chamber in the abutment. When the rotation of the piston carries the cam beyond the movable abutment, the latter moving inward will close the port E, as shown in Fig. 5, and put the outer end of the chamber D in communication with the space within the casing behind the retreating cam, as shown in Fig. 5, so that then the charge of motive fluid will act expansively on the piston to impel it forward. The abutment C thus itself acts as a cut-off valve to cut off the supply of motive fluid to the chamber D.

Although I prefer to so construct the outer end of the chamber D as to cut off the supply of motive fluid from the inlet-port E before opening communication between the said chamber and the working space in the back of the piston, this is not essential; but I regard it as important that the abutment acting as a valve shall close the inlet-port E, cutting off the motive-fluid supply to the chamber D during most of the time the charge of motive fluid is acting on the piston, so that such charge of motive fluid may act expansively. This hollow movable abutment thus acting as a cut-off valve may also be termed a "charging" means, supplying definite charges of motive fluid to the working piston to act expansively thereon. In order that the quantity of the charge may be varied, I provide means for varying the capacity of the chamber D. This may be done by making the chamber cylindrical, as shown in the drawings, and providing a piston $d$ in the back part of the chamber with means for adjusting it therein. As such convenient means I provide a lever F on an axis $f$, and pivot to the outer end of the lever F a link $f'$, against which the back part of the piston $d$ rests. This piston $d$ may be pushed forward in the chamber D, as illustrated in Fig. 6, where a very small charge of motive fluid is required, or it may be adjusted to any other suitable position in the chamber, depending on the size of the charge required. The levers F may be controlled together by connecting the arms $f^2$ on the shafts $f$ by a link $f^3$, Fig. 3. A manipulating-lever G (shown in Figs. 2 and 3) on one of the shafts $f$, provided with a suitable form of locking-latch $g$ to engage notches in a fixed quadrant G', enables the pistons $d$ to be set at any desired point in the chambers D.

In order to keep the free ends of the abutments C in contact with the periphery of the piston while the motive fluid is acting on the latter, I provide at about a right angle to the chamber D a small lateral chamber H in each abutment, Figs. 4, 5, and 6, and in this chamber is a piston $h$, the outer end of which rests against an antifriction-roller $h'$, carried by a fixed part of the casing. The pressure of motive fluid within the chamber D thus acts against the piston $h$ to force the free end of the abutment against the piston with a pressure depending on the pressure of the charge contained in the abutment and working space in the main casing. The side faces of the abutment adjacent to its end valve-face (which works against the part of the casing carrying the port E) work in close contact with the side plates of the casing; but behind these parts of the abutment and toward the pivoting-point is an open space, as at X, Figs. 2 and 3, to the atmosphere, so that there is not only free opportunity for the exhaust through this opening X, but also if toward the end of a stroke there would otherwise be a tendency to creation of a vacuum in the space between the face of one of the abutments and the retreating cam as the piston rotates, such vacuum formation is prevented by the entrance of air under the abutment at Y, Figs. 5 and 6, since there is then no longer any pressure of motive fluid to act against the piston $h$ to press the abutment against the piston A.

In connection with the swinging abutment-levers C, I prefer to provide an automatic governing device which acts by engaging with the abutments to prevent their delivery of motive fluid to the piston when the motor is running too fast. While I do not intend to limit myself to or to claim any specific form of such a governing device, I have illustrated in Fig. 8 by way of example a construction by which the abutments of my motor may be governed.

On one end of the shaft A' of the rotary piston is mounted a transverse tube T. In one end of this tube slides a weight W, held suspended therein by a spiral spring S, which is itself carried by an adjustable plug P in the tube T. This plug may be made adjustable in the tube T by threading it into the interior of the tube, as shown. As the shaft A' revolves the weight W will tend by centrifugal action to slide outward against the pull of the spring S, and the latter is so adjusted that when the motor is running at or below normal speed the weight will not strike the curved inner face of a lever M, pivoted at $m$ to the casing, but when the normal speed is exceeded the centrifugal action will force the weight W so far out as to strike the lever M at the moment when the cams $a$ of the piston are about to pass beyond the ends of the abutments, as shown in Fig. 8. The lever M has an arm $m'$, acting on the latch N, for the adjacent abutment C. Another arm $m^2$ through a connecting-rod $r$ and lever M', pivoted at $m^3$ to the casing, acts on a like latch N' for the other abutment C, so that on the described excess of speed the latches N N' will be thrown into engagement with their respective abutments, and the pressure of motive fluid tending to force the abutments toward the piston will hold the latches in engagement until the cams $a$ coming around give the abutments a slight push outward, whereupon spiral springs $n$, acting on the latches, push them out of engagement with its abutments, unless the governor-weight W, acting upon the arm M, prevents.

I claim as my invention—

1. A rotary motor, having a casing, and a rotary piston therein, with cams, in combination with movable abutments having charging-chambers, the abutments constituting cut-off valves to cut off the supply of motive fluid to the charging-chambers, which then deliver the said motive fluid to the working spaces in the casing to work expansively on the piston, all substantially as described.

2. A rotary motor, having a casing and a rotary piston therein with cams, in combination with pivoted swinging abutments provided with charging-chambers, adapted when the abutments are in their outward positions to be open to the inlets for the motive fluid, but when moved to their inner positions to cut off the supply of motive fluid to the chambers and to deliver the charges to the piston, substantially as described.

3. A rotary motor, having a casing, and a rotary piston therein, with cams, in combination with movable abutments working in conjunction with the piston and having chambers to receive charges of motive fluid from the inlets, and to deliver said charges to the piston and means for varying the capacities of said chambers, substantially as described.

4. A rotary motor, having a casing and a rotary piston therein with cams, in combination with pivoted swinging abutments provided with charging-chambers adapted when the abutments are in their outward positions to be open to the inlets for the motive fluid but when moved to their inner positions to cut off the supply of motive fluid to the chambers and to deliver the charges to the piston, and means for varying the capacities of said chambers, substantially as described.

5. A rotary motor having a casing and a rotary piston therein with cams, in combination with pivoted swinging abutments provided with charging-chambers for the motive fluid, pistons in the backs of said charging-chambers, and means under the control of the engineer for varying the positions of the pistons in said charging-chambers to vary the capacities of the latter, as and for the purpose described.

6. A rotary motor, having a casing and a rotary piston therein, with cams, in combination with movable abutments working in conjunction with the piston to admit motive fluid to work expansively on the piston, and means whereby the pressure of motive fluid acting on the piston, presses the abutments up to the latter, as and for the purpose described.

7. A rotary motor having a casing and a rotary piston therein with cams, in combination with pivoted swinging abutments having chambers to receive charges of motive fluid and deliver them to the piston to work expansively, and means whereby the pressure of motive fluid in the charging-chambers presses the abutments up to the piston, as and for the purpose described.

8. A rotary motor having a casing and a rotary piston therein with cams in combination with pivoted swinging abutments having chambers to receive charges of motive fluid and to deliver them to the piston to work expansively with lateral chambers opening into the charging-chambers, pistons in said lateral chambers and fixed points against which the outer ends of these pistons may bear, as and for the purpose described.

9. A rotary motor having a casing and a rotary piston therein, with cams, in combination with pivoted swinging abutments adapted when in their inward positions to deliver motive fluid to the piston, and a governing device adapted to temporarily hold the said abutments in their outward positions when the motor runs too fast, substantially as described.

In testimony whereof I have signed my name to this specification in the presence of two subscribing witnesses.

VINCENT F. LAKE.

Witnesses:
MURRAY C. BOYER,
JOS. H. KLEIN.